(12) United States Patent
Lee et al.

(10) Patent No.: US 12,437,428 B2
(45) Date of Patent: Oct. 7, 2025

(54) METHOD FOR TRAINING AN IMAGE DEPTH RECOGNITION MODEL, METHOD FOR RECOGNIZING IMAGE DEPTH, AND ELECTRONIC DEVICE

(71) Applicant: HON HAI PRECISION INDUSTRY CO., LTD., New Taipei (TW)

(72) Inventors: Chieh Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 355 days.

(21) Appl. No.: 18/125,675

(22) Filed: Mar. 23, 2023

(65) Prior Publication Data

US 2024/0005535 A1  Jan. 4, 2024

(30) Foreign Application Priority Data

Jul. 4, 2022  (CN) .......................... 202210785650.6

(51) Int. Cl.
*G06K 9/00* (2022.01)
*G06T 7/11* (2017.01)
(Continued)

(52) U.S. Cl.
CPC .................. *G06T 7/50* (2017.01); *G06T 7/11* (2017.01); *G06T 7/70* (2017.01); *G06V 10/25* (2022.01);
(Continued)

(58) Field of Classification Search
CPC . G06T 2207/20084; G06T 2207/10028; G06T 7/11; G06T 2207/20081; G06T 5/77; G06T 7/579; G06T 7/50; G06T 15/20; G06T 15/40; G06T 19/006; G06T 2207/10004; G06T 2207/10024; G06T 7/593; G06T 2207/10012; G06T 2207/30201; G06T 5/60; G06T 7/246;
(Continued)

(56) References Cited

U.S. PATENT DOCUMENTS

2021/0023694 A1* 1/2021 Chen ...................... B25J 9/0081

OTHER PUBLICATIONS

P. Li, X. Chen and S. Shen, "Stereo R-CNN Based 3D Object Detection for Autonomous Driving," 2019 IEEE/CVF Conference on Computer Vision and Pattern Recognition (CVPR), Long Beach, CA, USA, 2019, pp. 7636-7644 (Year: 2019).*

(Continued)

*Primary Examiner* — Alex Kok S Liew
(74) *Attorney, Agent, or Firm* — ScienBiziP, P.C.

(57) ABSTRACT

The present application relates to image processing and provides a method for training an image depth recognition model, a method for recognizing image depth, and an electronic device. The method obtains static objects, dynamic objects, a dynamic position by performing an instance segmentation on the first image and the second image. A target dynamic object and a feature dynamic object are selected from the dynamic objects and the dynamic objects. A target image and a target projection image are generated according to the target dynamic object and the feature dynamic object. A depth recognition model is trained based on the target image, and the target projection image. The to-be-recognized image is recognized by the depth recognition model.

19 Claims, 4 Drawing Sheets

(51) Int. Cl.
  *G06T 7/50* (2017.01)
  *G06T 7/70* (2017.01)
  *G06V 10/25* (2022.01)
  *G06V 10/44* (2022.01)
  *G06V 10/74* (2022.01)
  *G06V 10/764* (2022.01)
  *G06V 10/771* (2022.01)

(52) U.S. Cl.
  CPC ............ *G06V 10/44* (2022.01); *G06V 10/761* (2022.01); *G06V 10/764* (2022.01); *G06V 10/771* (2022.01); *G06T 2207/10028* (2013.01); *G06T 2207/20081* (2013.01)

(58) Field of Classification Search
  CPC ....... G06T 11/00; G06T 17/00; G06T 17/205; G06T 19/20; G06T 2207/20104; G06V 10/82; G06V 10/764; G06V 10/454; G06V 10/751; G06V 10/7715; G06V 20/647; G06V 10/774; G06V 10/26; G06V 10/44; G06V 10/761; G06V 10/24; G06V 10/25; G06V 10/32; G06V 10/42
  See application file for complete search history.

(56) References Cited

OTHER PUBLICATIONS

W. Peng, H. Pan, H. Liu and Y. Sun, "IDA-3D: Instance-Depth-Aware 3D Object Detection From Stereo Vision for Autonomous Driving," 2020 IEEE/CVF Conference on Computer Vision and Pattern Recognition (CVPR), Seattle, WA, USA, 2020, pp. 13012-13021 (Year: 2020).*

Weiyue Wang, Ulrich Neumann, Depth-aware CNN for RGB-D Segmentation, Proceedings of the European Conference on Computer Vision (ECCV), 2018, pp. 135-150 (Year: 2018).*

* cited by examiner

METHOD FOR TRAINING AN IMAGE DEPTH RECOGNITION MODEL, METHOD FOR RECOGNIZING IMAGE DEPTH, AND ELECTRONIC DEVICE

FIELD

The present disclosure relates to an image processing technology, especially to a method for training an image depth recognition model, a method for recognizing image depth, and an electronic device.

BACKGROUND

Generally, in relation to recognition of vehicles in images, training images are used to train deep networks. However, because the training images usually include dynamic objects, movements of the dynamic objects may cause poor training accuracy of the train deep network. Thus, the trained deep network cannot accurately recognize depth information of the vehicle images.

DETAILED DESCRIPTION

To provide a clearer understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing embodiments and are not intended to limit the present disclosure.

Figure 1:
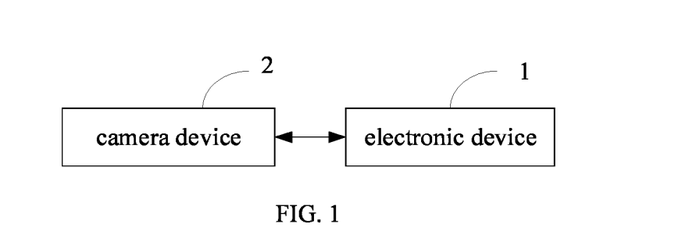
FIG. 1 is a block diagram of an application environment provided in an embodiment of the present application.

FIG. 1 is a block diagram of an application environment provided in an embodiment of the present application. A method for training an image depth recognition model and a method for recognizing image depth can be applied to one or more electronic devices. The electronic device 1 communicates with a camera device 2, and the camera device 2 can be a monocular camera or other device that achieves photographing.

The electronic device 1 is a device that can automatically perform parameter value calculation and/or information processing according to pre-set or stored instructions, and its hardware includes, but is not limited to: a microprocessor, an application specific integrated circuit (Application Specific Integrated Circuit) Circuit, ASIC), programmable gate array (Field-Programmable Gate Array, FPGA), digital signal processor (Digital Signal Processor, DSP), embedded devices, etc.

The electronic device 1 may be any electronic product that can interact with a user, such as a personal computer, a tablet computer, a smart phone, a personal digital assistant (PDA), a game console, and an interactive network television. (Internet Protocol Television, IPTV), smart wearable devices, etc.

The electronic device 1 may also include network equipment and/or user equipment. Wherein, the network device includes, but is not limited to, a single network server, a server group formed by multiple network servers, or a cloud formed by many hosts or network servers based on cloud computing (Cloud Computing).

The network including the electronic device 1 includes, but is not limited to, the Internet, a wide area network, a metropolitan area network, a local area network, a virtual private network (Virtual Private Network, VPN), and the like.

Figure 2:
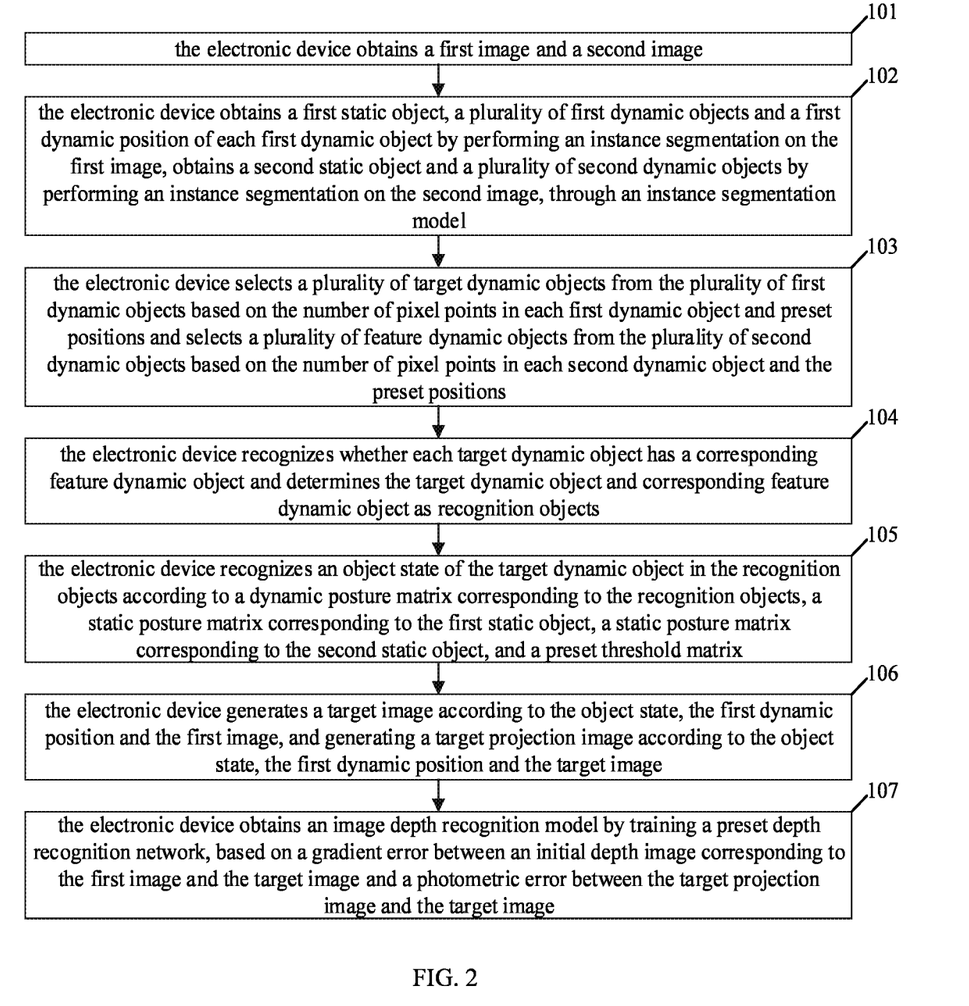
FIG. 2 is a flowchart of a method for training an image depth recognition model provided in an embodiment of the present application.

FIG. 2 is a flowchart of a method for training an image depth recognition model provided in an embodiment of the present application. According to different needs, the order of the steps in the flowchart can be changed, and some can be omitted. The element executing the method for training an image depth recognition model is applied in an electronic device, such as the electronic device 1 shown in FIG. 1.

At block 101, the electronic device obtains a first image and a second image.

In at least one embodiment, the first image and the second image are images showing three primary colors (Red Green Blue (RGB)) of adjacent frames. A time of obtaining the second image is later than a time of obtaining the first image. The first image and the second image may include objects such as vehicles, roads and paths, pedestrians, sky, trees, etc. The first image and the second image contain substantially the same initial objects.

In at least one embodiment, the electronic device obtaining the first image and the second image includes:

The electronic device controls a camera device to photograph a target scene to obtain the first image, and then photograph the target scene again after a preset time to obtain the second image.

The camera device can be a monocular camera, and the target scene can include vehicles, roads and paths, pedestrians, and other target objects. It is understandable that the preset time is very small, for example, the preset time can be 10 ms.

At block 102, the electronic device obtains a first static object, a plurality of first dynamic objects and a first dynamic position of each first dynamic object by performing an instance segmentation on the first image, obtains a second static object and a plurality of second dynamic objects by performing an instance segmentation on the second image, through an instance segmentation model.

In at least one embodiment, the first dynamic object and the second dynamic object refer to objects that can be moved, for example, pedestrians and vehicles, and the like. The first static objects and the second static objects refer to objects that cannot be moved, for example, trees, roads, and paths, and the like.

In some embodiments, the instance segmentation model includes a feature extraction layer, a classification layer, and a mapping layer.

In some embodiments, the electronic device obtaining a first static object, a plurality of first dynamic objects and a first dynamic position of each first dynamic object by performing an instance segmentation on the first image includes:

The electronic device standardizes the first image and obtains a standardized image; performs a feature extraction on the standardized image through the feature extraction layer and obtains an initial feature map; segments the standardized image to obtain a rectangular area corresponding to each pixel point in the initial feature map, based on a multiple relation between a size of the initial feature image and a size of the standardized image and a convolution step in the feature extraction layer; classifies the initial feature map and obtains a prediction probability that each pixel point in the initial feature map belongs to a first preset category through the classification layer; determines a plurality of pixel points corresponding to the prediction probability with a value greater than a preset threshold in the initial feature map as a plurality of target pixel points; determines a plurality of rectangular areas corresponding to the plurality of target pixel points as a plurality of feature areas; maps each feature area into the initial feature map through the mapping layer, and obtains a plurality of mapping areas; divides the plurality of mapping areas based on a preset quantity and obtains a plurality of partition areas; determines a center pixel point in each partition area; calculates a pixel value of the center pixel point; pools the pixel value of the center pixel point and obtains a mapping probability value corresponding to each mapping area; restores the plurality of mapping areas and obtains a target feature map by splicing the plurality of restored mapping areas; generates the first static object, the plurality of first dynamic objects and the first dynamic position of each first dynamic object according to the target feature map, the mapping probability value, the plurality of restored mapping areas and a second preset category.

A shape of the standardized image is usually a square. Standardizing the first image includes clipping the first image. The feature extraction layer includes a convolution layer, a batch standardization layer, a pooling layer, and the like. The feature extraction layer can be a VGG network after removing a full connection layer. In some embodiments, the pixel value of the center pixel point can be calculated by bilinear interpolation algorithms, which is a prior art and will not be repeated. The mapping layer can be a ROI Align layer.

The first preset category can be customized. For example, the first preset category can be foreground or background. The classification layer can be a full connection layer and a SoftMax layer. The preset threshold and the preset quantity can be customized, which are not limited here. The second preset category can be set according to target objects appearing in the target scene. For example, the second preset category can include, but not limited to, cars, buses, roads, pedestrians, streetlights, sky, buildings, etc.

In some embodiments, the instance segmentation model also includes a full convolution neural network, which is used to restore the plurality of mapping areas.

The electronic device segmenting the standardized image and obtains a rectangular area corresponding to each pixel point in the initial feature map, based on a multiple relation between a size of the initial feature image and a size of the standardized image and the convolution step in the feature extraction layer, includes:

The electronic device segments the standardized image and obtains a rectangular area corresponding to each pixel point in the initial feature map, based on a product of the multiple relation and the convolution step.

A width and a height of the rectangular area corresponding to each pixel point in the initial feature map are the product of the multiple relation and the convolution step.

For example, the size of the standardized image is 800*800, the size of the initial feature map is 32*32, and the convolution step is 4. The multiple relation between the size of the initial feature map 32*32 and the size of the standardized image 800*800 is 25, and the product of the multiple relationship and the convolution step is 100. The electronic device segments the standardized image into eight rectangular areas, each of which has a size of 100*100.

The preset quantity includes a first preset quantity and a second preset quantity. The electronic device dividing the plurality of mapping areas based on a preset quantity and obtains a plurality of partition areas corresponding to each mapping area, includes:

Divides each mapping area based on the first preset quantity and obtains a plurality of intermediate areas corresponding to each mapping area; divides each intermediate area based on the second preset quantity and obtains a plurality of partition areas corresponding to each mapping area.

The first preset quantity and the second preset quantity can be customized, which are not limited here. For example, the first preset quantity can be 7*7, and the second preset quantity can be 2*2. When the size of the mapping area is 14*14, the mapping area is divided into 7*7 intermediate areas, and the size of each intermediate area is 2*2, each intermediate area is divided into 2*2 partition areas, and the size of each partition area is about 0.5*0.5.

The instance segmentation model also outputs a position of the first static object, a position of the second static object, a category of each target dynamic object, a category of the first static object, a category of the second static object and a category of each feature dynamic object.

Through the above embodiments, the first image and the second image are segmented based on the instance segmentation model, and each initial object in the first image and the second image can be distinguished according to the position, so that each initial object can be processed based on the position.

In some embodiments, the electronic device generating the first static object, the plurality of first dynamic objects and the first dynamic position of each first dynamic object according to the target feature map, the mapping probability value, the plurality of restored mapping areas and a second preset category, includes:

The electronic device classifies each pixel point in the target feature map according to the mapping probability value and the second preset category, and obtains a pixel category of each pixel point in the restored mapping areas; determines areas composed of a plurality of pixel points corresponding to the same pixel category in the restored mapping areas as a first object; acquires pixel coordinates of all pixel points in the first object; determines the pixel coordinates as a first position corresponding to the first object; determines whether the first object is the first dynamic object or the first static object according to preset rules and determines the first position corresponding to the first dynamic object as the first dynamic position.

The preset rules determine the movable initial objects such as walking tools, people, or animals as the first dynamic objects, and the immovable initial objects such as plants and fixed objects as the first static objects. For example, the movable pedestrians, kittens, dogs, bicycles, and cars are determined as the first dynamic objects, and the immovable trees, streetlights, buildings, and other initial objects are determined as the first static objects.

In some embodiments, a method for determining the second dynamic objects is basically the same as a method for determining the first dynamic objects. A method for determining the second static object is basically the same as a method for determining the first static object, so the present application will not be repeated here.

At block 103, the electronic device selects a plurality of target dynamic objects from the plurality of first dynamic objects based on the number of pixel points in each first dynamic object and preset positions and selects a plurality of feature dynamic objects from the plurality of second dynamic objects based on the number of pixel points in each second dynamic object and the preset positions.

In at least one embodiment, the electronic device selecting a plurality of target dynamic objects from the plurality of first dynamic objects based on the number of pixel points in each first dynamic object and preset positions, includes:

The electronic device calculates the number of the pixel points in each first dynamic object; sorts the plurality of first dynamic objects according to the number of pixel points; selects the sorted first dynamic object at the preset positions as the plurality of target dynamic objects.

The preset positions can be customized, for example, a first five.

In one embodiment, a method for selecting the plurality of feature dynamic objects is basically the same as a method for selecting the plurality of target dynamic objects, which is not repeated here.

In one embodiment, a method for generating the second static image is basically the same as a method for generating the first static image, and a method for generating the second dynamic image is basically the same as a method for generating the first dynamic image, which are not repeated here.

Through the above embodiments, the number of the first dynamic objects is reduced by selecting the plurality of target dynamic objects and the plurality of feature dynamic objects based on the number of pixel points and the preset positions, thus a training speed of the image depth recognition model can be improved.

At block 104, the electronic device recognizes whether each target dynamic object has a corresponding feature dynamic object and determines the target dynamic object and corresponding feature dynamic object as recognition objects.

In at least one embodiment, the electronic device recognizing whether each target dynamic object has a corresponding feature dynamic object, includes:

The electronic device acquires a plurality of target element information of each target dynamic object; acquires feature element information in the feature dynamic object with a same category as each target element information; matches each target element information with feature element information of the same category to obtain a matching value; when the matching value is within a preset interval, determines that the target dynamic object has a corresponding feature dynamic object.

The plurality of target element information and the feature element information corresponding to each target element information can be obtained based on a target tracking algorithm. The target tracking algorithm is a prior art and will not be described here. The preset interval can be set according to actual needs without any restrictions.

In some embodiments, the plurality of target element information can be parameters of features of the target dynamic object, and the plurality of feature element information can be parameters of features of the feature dynamic object of the same category. For example, when the target dynamic object is a car, the plurality of target element information can be a size of the car, a texture of the car, a position of the car, a contour of the car, and so on. Because the parameters of each target element information and corresponding feature element information are different, matching processing methods are also different. The matching processing methods include subtraction, addition, weighting, and other operations. For example, the target dynamic object in the first image and the feature dynamic object in the second image are cars, the car in the first image is 4.8 meters long and 1.65 meters wide, the car in the second image is 4.7 meters long and 1.6 meters wide, a first matching value is 0.1 meters by subtracting 4.8 meters of the car in the first image from 4.7 meters of the car in the second image, and a second matching value is 0.05 meters by subtracting 1.65 meters of the car in the first image from 1.6 meters of the car in the second image. When the first preset interval corresponding to the first matching value is [0,0.12] and the second preset interval corresponding to the second matching value is [0,0.07], because the first matching value is within the first preset interval and the second matching value is within the second preset interval, the car in the second image and the car in the first image are the same car.

Through the above embodiments, by acquiring the plurality of target element information of each target dynamic object and the feature element information in the feature dynamic object with the same category as each target element information, the same feature dynamic object and target dynamic object can be quickly identified. By selecting the plurality of target element information and matching each target element information with the corresponding feature element information, the features of target dynamic objects and feature dynamic objects of the same category can be extracted more comprehensively, so as to eliminate reasonable errors and improve a matching accuracy.

At block 105, the electronic device recognizes an object state of the target dynamic object in the recognition objects according to a dynamic posture matrix corresponding to the recognition objects, a static posture matrix corresponding to the first static object, a static posture matrix corresponding to the second static object, and a preset threshold matrix.

In at least one embodiment, the dynamic posture matrix refers to a transformation relationship from a camera coordinate of the pixel points corresponding to the recognition objects and a world coordinates. The camera coordinate of the pixel points corresponding to the recognition objects refers to a coordinate of each pixel point in a camera coordinate system. The static posture matrix corresponding to the first static object refers to a transformation relationship from a camera coordinate corresponding to the first static object to the world coordinate. The static posture matrix corresponding to the second static object refers to a transformation relationship from a camera coordinate corresponding to the second static object to the world coordinate.

Figure 3:
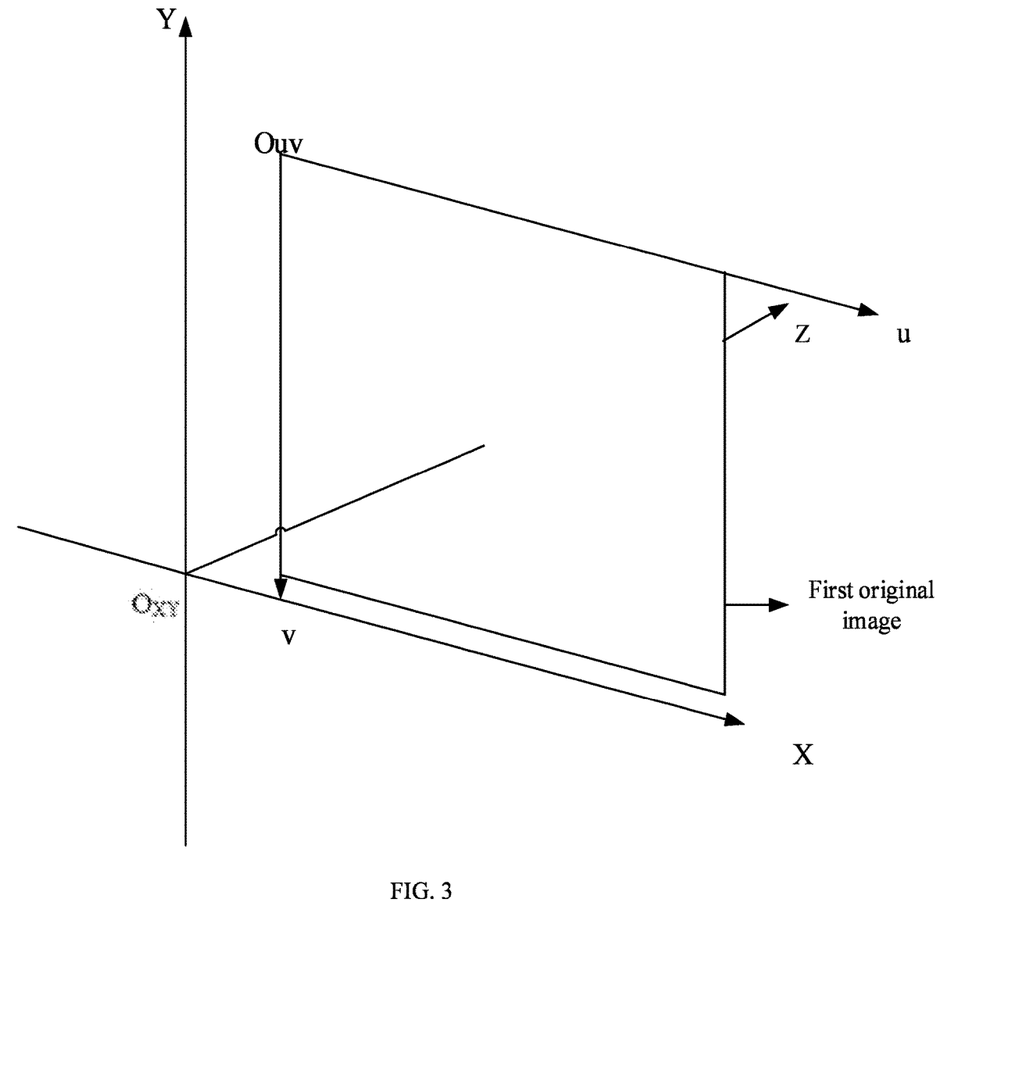
FIG. 3 is a schematic diagram of a pixel coordinate system and a camera coordinate system provided in an embodiment of the present application.

FIG. 3 shows a pixel coordinate system and a camera coordinate system provided in an embodiment of the present application. The electronic device takes a pixel OUV in a first row and a first column of the first image as an origin of coordinate, takes a parallel line corresponding to the first row of the first image as a U-axis, and takes a vertical line corresponding to the first column of the first image as a V-axis, to build a pixel coordinate system. In addition, the electronic device takes a light spot OXY of the monocular camera as an origin of coordinate, takes an optical axis of the monocular camera as Z-axis, takes a parallel line corresponding to the U-axis of the pixel coordinate system as X-axis, and takes a line parallel corresponding to the V-axis of the pixel coordinate system as Y-axis, to build a camera coordinate system.

In at least one embodiment, the electronic device recognizing an object state of the target dynamic object in the recognition objects according to a dynamic posture matrix corresponding to the recognition objects, a static posture matrix corresponding to the first static object, a static posture matrix corresponding to the second static object, and a preset threshold matrix, includes:

The electronic device performs a subtraction operation on each matrix element in the static posture matrix and a corresponding matrix element in the dynamic posture matrix corresponding to the recognition objects and obtains a plurality of posture differences; takes an absolute value of the plurality of posture differences and obtains posture absolute values corresponding to the static posture matrix; arranges the posture absolute values and obtaining a posture absolute value matrix, according to an element position of posture absolute values; compares each posture absolute value in the posture absolute value matrix with a corresponding posture threshold in the preset threshold matrix; when there is at least one posture absolute value greater than the corresponding posture threshold in the posture absolute value matrix, determines that the object state of the target dynamic object in the recognition objects is movable; when there is no posture absolute value greater than the corresponding posture threshold in the posture absolute value matrix, determines that the object state of the target dynamic object in the recognition objects is stillness.

In at least one embodiment, a method for generating the dynamic posture matrix includes:

The electronic device determines pixel points corresponding to the target dynamic objects corresponding to the recognition objects in the first image as first pixel points. Further, the electronic device determines pixel points corresponding to the feature dynamic objects corresponding to the recognition objects in the second image as second pixel points. Further, the electronic device acquires a first homogeneous coordinate matrix of the first pixel points and acquires a second homogeneous coordinate matrix of the second pixel points. Further, the electronic device acquires an inverse matrix of an internal parameter matrix of the camera device photographing the first image and the second image. Further, the electronic device calculates first camera coordinates of the first pixel points according to the first homogeneous coordinate matrix and the inverse matrix of the internal parameter matrix and calculates second camera coordinates of the second pixel points according to the first homogeneous coordinate matrix and the inverse matrix of the internal parameter matrix. Further, the electronic device calculates the first camera coordinates and the second camera coordinates based on a preset polar constraint relationship and obtains a rotation matrix and a translation matrix and obtains the target posture matrix by splicing the rotation matrix and the translation matrix.

The first homogeneous coordinate matrix of the first pixel points refers to a matrix with an additional dimension, being one more dimension than that of a pixel coordinate matrix, and an element value of the additional dimension is 1. The pixel coordinate matrix refers to a matrix generated according to first pixel coordinates of the first pixel points. The first pixel coordinate refers to a coordinate of the first pixel point in the pixel coordinate system. For example, the first pixel coordinate of the first pixel point in the pixel coordinate system may be (u, v), and the pixel coordinate matrix of the first pixel point may be $$\begin{bmatrix} u \\ v \end{bmatrix};$$

then the homogeneous coordinate matrix of the first pixel point is $$\begin{bmatrix} u \\ v \\ 1 \end{bmatrix}.$$

Multiplying the first homogeneous coordinate matrix and the inverse matrix of the internal parameter matrix, the first camera coordinate of the first pixel points is obtained. Multiplying the second homogeneous coordinate matrix and the inverse matrix of the internal parameter matrix, the second camera coordinate of the second pixel points is obtained.

In some embodiments, a method for generating the second homogeneous coordinate matrix is basically the same as a method for generating the first homogeneous coordinate matrix, which will not be repeated in the present application.

The rotation matrix can be expressed as:

$$\text{pose} = \begin{bmatrix} R & t \\ 0 & 1 \end{bmatrix};$$

Wherein, pose is the dynamic posture matrix, the dynamic posture matrix is a 4×4 matrix, R is the rotation matrix, the rotation matrix is a 3×3 matrix, t is the translation matrix, and the translation matrix is a 3×1 matrix.

Wherein, a formula for calculating the translation matrix and the rotation matrix is:

$$K^{-1}p_1(t \times R)(K^{-1}p_2)^T = 0;$$

Wherein, $K^{-1}p_1$ is the first camera coordinate, $K^{-1}p_2$ is the second camera coordinate, $p_1$ is the first homogeneous coordinate matrix, $p_2$ is the second homogeneous coordinate matrix, and $K^{-1}$ is the inverse matrix of the internal parameter matrix.

In some embodiments, a method for generating the static posture matrix is basically the same as a method for generating the dynamic posture matrix, which will not be repeated in the present application.

Through the above-mentioned embodiments, when there is a plurality of recognition objects, the number of the dynamic posture matrix is also several. Since each dynamic posture matrix corresponds to each target dynamic object in the first image, the object state of the corresponding target dynamic object in the first image can be determined by each dynamic posture matrix, so that the object state of the plurality of target dynamic objects can be distinguished.

At block 106, the electronic device generates a target image according to the object state, the first dynamic position and the first image, and generating a target projection image according to the object state, the first dynamic position and the target image.

In at least one embodiment, the target image refers to an image generated after processing the target dynamic object in the first image based on the first dynamic position and the object state.

In at least one embodiment, the target image is an image representing a transformation process. The transformation process refers to a transformation process between the pixel coordinates of the pixel points in the first image and the corresponding pixel coordinates of the pixel points in the second image.

In at least one embodiment, the electronic device generating a target image according to the object state, the first dynamic position and the first image includes:

When the object state of any target dynamic object in the recognition objects is movable, the electronic device masks the any target dynamic object in the first image based on the first dynamic position of the any target dynamic object and obtaining the target image; when the object state of each target dynamic objects in the recognition objects is stillness, the electronic device determines the first image as the target image.

In at least one embodiment, a method for generating the target image includes:

The electronic device acquires an initial depth image of the first image and a target homogeneous coordinate matrix of each pixel point in the first image. Further, the electronic device acquires a depth value of each pixel point in the first image from the initial depth image. Further, the electronic device calculates projection coordinates of each pixel point in the first image based on the target posture matrix, the target homogeneous coordinate matrix of each pixel point, and the depth value of each pixel point. Further, the electronic device obtains the target image by arranging each pixel point according to the projection coordinates of each pixel point.

The depth value refers to a pixel value of each pixel point in the initial depth image.

Specifically, a formula for calculating a projected coordinate of each pixel point in the target image is:

$$P = K * pose * Z * K^{-1} * H;$$

Wherein, P represents the projected coordinate of each pixel point, K represents the internal parameter matrix of the camera device, pose represents the target posture matrix, $K^{-1}$ represents the inverse matrix of K, and H represents the target homogeneous coordinate matrix of each pixel point in the first image. Z represents the depth value of the corresponding pixel point in the initial depth image.

In at least one embodiment, the target projection image includes a plurality of projection objects corresponding to the plurality of target dynamic objects. A method of generating the target projection image based on the plurality of projection objects is basically the same as a method of generating the target image, which is not described here.

Through the above embodiments, When the object state of the target dynamic object corresponding to the recognition objects is moving, the target dynamic object can be accurately masked in the first image according to the first dynamic position of the target dynamic object, which can avoid an influence of the moving dynamic object on a calculation of the loss value. When the object state of the target dynamic object corresponding to the recognition objects is stillness or immovable, the target dynamic object is retained in the first image, and more image information of the first image can be retained.

At block 107, the electronic device obtains an image depth recognition model by training a preset depth recognition network, based on a gradient error between an initial depth image corresponding to the first image and the target image and a photometric error between the target projection image and the target image.

In at least one embodiment, the preset threshold matrix refers to a preset matrix with the same dimension as the posture absolute value matrix, and the preset threshold matrix includes a plurality of thresholds. The image depth recognition model refers to a model generated by training the depth recognition network.

In at least one embodiment, the electronic device obtaining an image depth recognition model by training a preset depth recognition network, based on a gradient error between an initial depth image corresponding to the first image and the target image and a photometric error between the target projection image and the target image, includes:

The electronic device calculates a depth loss value of the preset depth recognition network based on the gradient error and the photometric error. Further, the electronic device iteratively trains the preset depth recognition network based on the depth loss value and obtaining the image depth recognition model when the depth loss value is reduced to a minimum.

The depth recognition network can be a deep neural network, and the depth recognition network can be obtained from a database of the Internet.

Specifically, a formula for calculating the depth loss value is:

$$Lc = Lt + Ls;$$

Wherein, Lc represents the depth loss value, Lt represents the photometric error, and Ls represents the gradient error.

Wherein, a formula for calculating the photometric error is:

$$Lt = \alpha \frac{1 - SSIM(x, y)}{2} + (1-\alpha)\|x_i - y_i\|;$$

Wherein, Lt represents the photometric error, α is a preset balance parameter which generally takes a value of 0.85, SSIM(x, y) represents a structural similarity index between the target projection image and the target image, and $\|x_i - y_i\|$ represents a grayscale difference between the target projection image and the target image. $x_i$ represents a pixel value of the i-th pixel point of the target projection image, and $y_i$ represents a pixel value of a pixel point corresponding to the i-th pixel point in the target image. Methods for calculating the structural similarity index is the prior art, and the present application will not be repeated here.

A formula for calculating the gradient error is:

$$Ls = \sum\nolimits_{i \in \{x, y\}} \left| \partial_i \left( \frac{1}{D(u, v)} \right) \right| e^{-\|\partial_i I(u, v)\|};$$

Wherein, Ls represents the gradient error, x represents the initial depth image, y represents the target image, and D(u, v) represents a pixel coordinate of the i-th pixel point in the initial depth image, I(u, v) represents a pixel coordinate of the i-th pixel point in the target image.

Through the above-mentioned embodiments, since the moving dynamic objects have no effect on the calculation of the loss value of the depth recognition network, an accuracy of the image depth recognition model can be improved.

Figure 4:
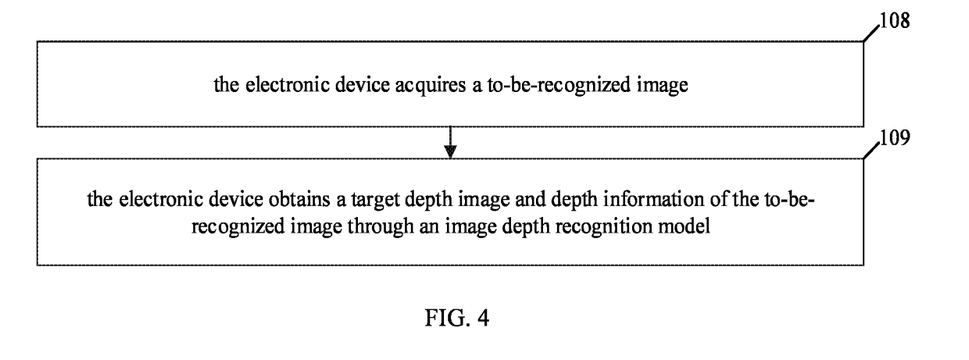
FIG. 4 is a flowchart of a method for recognizing image depth provided in an embodiment of the present application.

FIG. 4 is a flowchart of a method for recognizing image depth provided in an embodiment of the present application. According to different needs, the order of the steps in the flowchart can be changed, and some can be omitted. The element executing the method for recognizing image depth is applied in an electronic device, such as the electronic device 1 shown in FIG. 1.

At block 108, the electronic device acquires a to-be-recognized image.

In at least one embodiment, the to-be-recognized image refers to an image that needs to recognize depth information.

In at least one embodiment, the electronic device can acquire the to-be-recognized image from a preset database, and the preset database may be a KITTI database, a Cityscapes database, and a vKITTI database, etc.

At block 109, the electronic device obtains a target depth image and depth information of the to-be-recognized image through an image depth recognition model.

In at least one embodiment, the electronic device inputs the to-be-recognized image into the image depth recognition model, the image depth recognition model outputs target depth image and depth information of the to-be-recognized image. The target depth image refers to an image containing depth information of each pixel point in the to-be-recognized image. The depth information of each pixel point in the to-be-recognized image refers to a distance between the recognition objects corresponding to each pixel point in the to-be-recognized image and a camera device. The depth information of each pixel point in the image to-be-recognized refers to a distance between the recognition objects corresponding to each pixel point in the image to-be-recognized and the camera device that takes the image to-be-recognized.

In at least one embodiment, a method of generating the target depth image is basically the same as a method of generating the initial depth image, which is not repeated here.

In at least one embodiment, the electronic device acquires a pixel value of each pixel point in the target depth image as the depth information of the corresponding pixel point in the to-be-recognized image.

Through the above-mentioned embodiments, an accuracy of the precision of the image depth recognition model is improved, and an accuracy of the depth recognition of the to-be-recognized image can be improved.

The present application obtains the first static object, the plurality of first dynamic objects and the first dynamic position of each first dynamic object by performing the instance segmentation on the first image. By selecting the plurality of target dynamic objects from the plurality of first dynamic objects, Based on the number of pixel points in each first dynamic object and the preset positions, the number of the plurality of first dynamic objects is reduced, and the training speed of the depth recognition network can be improved. By recognizing whether each target dynamic object has a corresponding feature dynamic object, the same feature dynamic object as each target dynamic object can be quickly selected from the second image. By calculating the dynamic posture matrix of each target dynamic object and the same feature dynamic object and comparing the dynamic posture matrix with the preset threshold matrix, whether the state of each target dynamic object in the first image is moving can be determined accurately. By generating the target image according to the state of the target dynamic object corresponding to the recognition objects, the first dynamic position and the first image, the movable target dynamic object in the first image can be filtered. Because the position change of the movable target dynamic object will lead to the change of the depth value of the corresponding pixel point of the target dynamic object in the initial depth image, the impact of the movable target dynamic object on the loss value can be avoided by filtering the movable target dynamic object in the target image so that the depth value is not used for calculation when calculating the loss value. By retaining the target dynamic object in the stillness or immovable state in the target image, more image information of the first image can be retained, so that when using the target image to train the depth recognition model, the impact of the movable target dynamic object on the training accuracy of the depth recognition model can be avoided, thus improving the recognition accuracy of the depth recognition model.

Figure 5:
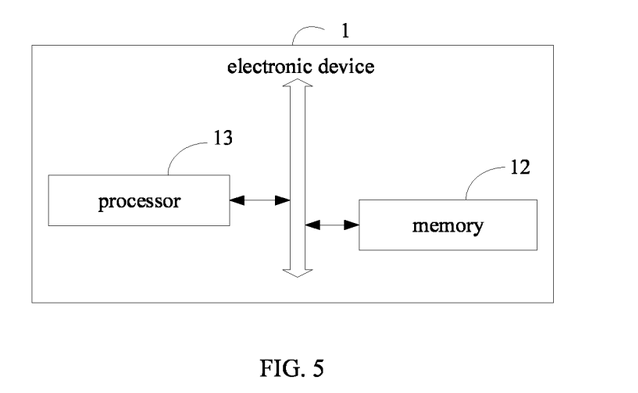
FIG. 5 is a structure diagram of an electronic device provided in an embodiment of the present application.

FIG. 5 shows a structure of the electronic device provided in an embodiment of the present application.

The electronic device 1 includes, but is not limited to, a memory 12, a processor 13, and a computer program that is stored in the memory 12 and can run on the processor 13, such as an image depth recognition model training program and an image depth recognition program.

In at least one embodiment, the electronic device 1 may include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the electronic device 1 is merely an example, and other examples may be included in the scope of the present disclosure and are thus included in the reference.

In some embodiments, the memory 12 can be used to store program codes of computer readable programs and various data, and automatically access the programs or data with high speed during the running of the electronic device 1. The memory 12 can include a read-only memory (ROM), a random access memory (RAM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the electronic device 1 that can be used to carry or store data.

The processor 13 acquires an operating system and various installed applications of the electronic device 1. The processor 13 acquires application programs to implement the steps in each of the above embodiments of the method for training an image depth recognition model, for example, the steps shown in FIG. 2. The processor 13 acquires application programs to implement the steps in each of the above embodiments of the method for recognizing image depth, for example, the steps shown in FIG. 4.

In some embodiments, the at least one processor 13 may be composed of an integrated circuit for example or may be composed of a single packaged integrated circuit, or multiple integrated circuits of same function or different functions. The at least one processor 13 can include one or more center processing units (CPU), a microprocessor, a digital processing chip, a graphics processor, and various control chips. The at least one processor 13 is a control unit of the electronic device 1, which connects various components of the electronic device 1 using various interfaces and lines. By running or executing a computer program or modules stored in the memory 12, and by invoking the data stored in the memory 12, the at least one processor 13 can perform various functions of the electronic device 1 and process data of the electronic device 1. For example, the processor 13 may perform the function of the image depth recognition model training shown in FIG. 2. For another example, the processor 13 may perform the function of the image depth recognition shown in FIG. 4.

The program codes are stored in memory 12 and at least one processor 13 may invoke the program codes stored in memory 12 to perform the related function. The program codes stored in the memory 12 can be executed by at least one processor 13, to realize the function of each module to achieve the purpose of image depth recognition model training shown in FIG. 2, and to realize the function of each module to achieve the purpose of image depth recognition shown in FIG. 4.

In one embodiment of this application, the memory 12 stores at least one instruction, and the at least one instruction is executed by the at least one processor 13 for the purpose of image depth recognition model training shown in FIG. 2, and the purpose of image depth recognition shown in FIG. 4.

The memory 12 in the electronic device 1 stores a plurality of instructions to realize a method for training an image depth recognition model, and the processor 13 can obtain the plurality of instructions to: obtain a first image and a second image; obtain a first static object, a plurality of first dynamic objects and a first dynamic position of each first dynamic object by performing an instance segmentation on the first image, obtaining a second static object and a plurality of second dynamic objects by performing an instance segmentation on the second image, through an instance segmentation model; select a plurality of target dynamic objects from the plurality of first dynamic objects based on the number of pixel points in each first dynamic object and preset positions and select a plurality of feature dynamic objects from the plurality of second dynamic objects based on the number of pixel points in each second dynamic object and the preset positions; recognize whether each target dynamic object has a corresponding feature dynamic object and determine the target dynamic object and corresponding feature dynamic object as recognition objects; recognize an object state of the target dynamic object in the recognition objects according to a dynamic posture matrix corresponding to the recognition objects, a static posture matrix corresponding to the first static object, a static posture matrix corresponding to the second static object, and a preset threshold matrix; generate a target image according to the object state, the first dynamic position and the first image, and generate a target projection image according to the object state, the first dynamic position and the target image; obtain an image depth recognition model by training a preset depth recognition network, based on a gradient error between an initial depth image corresponding to the first image and the target image and a photometric error between the target projection image and the target image.

The memory 12 in the electronic device 1 stores a plurality of instructions to realize a method for training an image depth recognition model, and the processor 13 can obtain the plurality of instructions to: acquire a to-be-recognized image and obtain a target depth image and depth information of the to-be-recognized image through an image depth recognition model.

Specifically, for the specific implementation method of the above-mentioned instruction by the processor 13, reference may be made to the description of the relevant steps in the embodiment of FIG. 2, and FIG. 4, which are not repeated here.

Although not shown, the electronic device 1 may further include a power supply (such as a battery) for powering various components. Preferably, the power supply may be logically connected to the at least one processor 13 through a power management device, thereby, the power management device manages functions such as charging, discharging, and power management. The power supply may include one or more DC or AC power sources, a recharging device, a power failure detection circuit, a power converter or inverter, a power status indicator, and the like. The electronic device 1 may further include various sensors, such as a BLUETOOTH module, a WI-FI module, and the like, and details are not described herein.

In the several embodiments provided in this disclosure, the devices and methods disclosed can be implemented by other means. For example, the device embodiments described above are only schematic, and the division of the modules is only a logical function division which can be implemented in other ways.

The modules described as separate parts may or may not be physically separate, and the parts displayed as modules may or may not be physical units, that is, may be in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any order.

The above describes embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A method for training an image depth recognition model by using an electronic device, the method comprising:
   obtaining a first image and a second image;
   obtaining a first static object, a plurality of first dynamic objects and a first dynamic position of each first dynamic object by performing an instance segmentation on the first image, obtaining a second static object and a plurality of second dynamic objects by performing an instance segmentation on the second image, through an instance segmentation model;
   selecting a plurality of target dynamic objects from the plurality of first dynamic objects based on a number of pixel points in each first dynamic object and preset positions, and selecting a plurality of feature dynamic objects from the plurality of second dynamic objects based on the number of pixel points in each second dynamic object and the preset positions;
   recognizing whether each target dynamic object has a corresponding feature dynamic object and determining the target dynamic object and corresponding feature dynamic object as recognition objects;
   recognizing an object state of the target dynamic object in the recognition objects according to a dynamic posture matrix corresponding to the recognition objects, a static posture matrix corresponding to the first static object, a static posture matrix corresponding to the second static object, and a preset threshold matrix;
   generating a target image according to the object state, the first dynamic position and the first image, and generating a target projection image according to the object state, the first dynamic position and the target image;
   obtaining an image depth recognition model by training a preset depth recognition network, based on a gradient error between an initial depth image corresponding to the first image and the target image and a photometric error between the target projection image and the target image.

2. The method for training an image depth recognition model according to claim 1, wherein the instance segmentation model comprises a feature extraction layer, a classification layer, and a mapping layer, wherein obtaining a first static object, a plurality of first dynamic objects and a first dynamic position of each first dynamic object by performing an instance segmentation on the first image comprises:
   standardizing the first image and obtaining a standardized image;
   performing a feature extraction on the standardized image through the feature extraction layer and obtaining an initial feature map;
   segmenting the standardized image to obtain a rectangular area corresponding to each pixel point in the initial feature map, based on a multiple relation between a size of the initial feature image and a size of the standardized image and a convolution step in the feature extraction layer;
   classifying the initial feature map and obtains a prediction probability that each pixel point in the initial feature map belongs to a first preset category through the classification layer;
   determining a plurality of pixel points corresponding to the prediction probability with a value greater than a preset threshold in the initial feature map as a plurality of target pixel points;
   determining a plurality of rectangular areas corresponding to the plurality of target pixel points as a plurality of feature areas;
   mapping each feature area into the initial feature map through the mapping layer, and obtaining a plurality of mapping areas;
   dividing the plurality of mapping areas based on a preset quantity and obtaining a plurality of partition areas;
   determining a center pixel point in each partition area;
   calculating a pixel value of the center pixel point;
   pooling the pixel value of the center pixel point and obtaining a mapping probability value corresponding to each mapping area;
   restoring the plurality of mapping areas and obtaining a target feature map by splicing the plurality of restored mapping areas;
   generating the first static object, the plurality of first dynamic objects and the first dynamic position of each first dynamic object according to the target feature map, the mapping probability value, the plurality of restored mapping areas and a second preset category.

3. The method for training an image depth recognition model according to claim 2, wherein generating the first static object, the plurality of first dynamic objects and the first dynamic position of each first dynamic object according to the target feature map, the mapping probability value, the plurality of restored mapping areas and a second preset category comprises:
   classifying each pixel point in the target feature map according to the mapping probability value and the second preset category, and obtaining a pixel point category of each pixel point in the restored mapping areas;
   determining areas composed of a plurality of pixel points corresponding to the same pixel point category in the restored mapping areas as a first object;
   acquiring pixel coordinates of all pixel points in the first object;
   determining the pixel coordinates as a first position corresponding to the first object;
   determining whether the first object is the first dynamic object or the first static object according to preset rules and determining the first position corresponding to the first dynamic object as the first dynamic position.

4. The method for training an image depth recognition model according to claim 1, wherein selecting a plurality of target dynamic objects from the plurality of first dynamic objects based on the number of pixel points in each first dynamic object and preset positions comprises:
   calculating the number of the pixel points in each first dynamic object;
   sorting the plurality of first dynamic objects according to the number of pixel points;
   selecting the sorted first dynamic object at the preset positions as the plurality of target dynamic objects.

5. The method for training an image depth recognition model according to claim 1, wherein recognizing whether each target dynamic object has a corresponding feature dynamic object comprises:
   acquiring a plurality of target element information of each target dynamic object;
   acquiring feature element information in the feature dynamic object with a same category as each target element information;
   matching each target element information with feature element information of the same category to obtain a matching value;

when the matching value is within a preset interval, determining that the target dynamic object has a corresponding feature dynamic object.

6. The method for training an image depth recognition model according to claim 1, wherein recognizing an object state of the target dynamic object in the recognition objects according to a dynamic posture matrix corresponding to the recognition objects, a static posture matrix corresponding to the first static object, a static posture matrix corresponding to the second static object, and a preset threshold matrix comprises:
performing a subtraction operation on each matrix element in the static posture matrix and a corresponding matrix element in the dynamic posture matrix corresponding to the recognition objects and obtaining a plurality of posture differences;
taking an absolute value of the plurality of posture differences and obtaining posture absolute values corresponding to the static posture matrix;
arranging the posture absolute values and obtaining a posture absolute value matrix, according to an element position of posture absolute values;
comparing each posture absolute value in the posture absolute value matrix with a corresponding posture threshold in the preset threshold matrix;
when there is at least one posture absolute value greater than the corresponding posture threshold in the posture absolute value matrix, determining that the object state of the target dynamic object in the recognition objects is movable;
when there is no posture absolute value greater than the corresponding posture threshold in the posture absolute value matrix, determining that the object state of the target dynamic object in the recognition objects is stillness.

7. The method for training an image depth recognition model according to claim 1, wherein generating a target image according to the object state, the first dynamic position and the first image comprises:
when the object state of any target dynamic object in the recognition objects is movable, masking the any target dynamic object in the first image based on the first dynamic position of the any target dynamic object and obtaining the target image;
when the object state of each target dynamic objects in the recognition objects is stillness, determining the first image as the target image.

8. The method for training an image depth recognition model according to claim 1, wherein obtaining an image depth recognition model by training a preset depth recognition network, based on a gradient error between an initial depth image corresponding to the first image and the target image and a photometric error between the target projection image and the target image comprises:
calculating a depth loss value of the preset depth recognition network based on the gradient error and the photometric error;
iteratively training the preset depth recognition network based on the depth loss value and obtaining the image depth recognition model when the depth loss value is reduced to a minimum.

9. A method for recognizing image depth by using an electronic device, the method comprising:
acquiring a to-be-recognized image;
obtaining a target depth image and depth information of the to-be-recognized image through an image depth recognition model;
wherein a method for training the image depth recognition model comprises:
obtaining a first image and a second image;
obtaining a first static object, a plurality of first dynamic objects and a first dynamic position of each first dynamic object by performing an instance segmentation on the first image, obtaining a second static object and a plurality of second dynamic objects by performing an instance segmentation on the second image, through an instance segmentation model;
selecting a plurality of target dynamic objects from the plurality of first dynamic objects based on the number of pixel points in each first dynamic object and preset positions and selecting a plurality of feature dynamic objects from the plurality of second dynamic objects based on the number of pixel points in each second dynamic object and the preset positions;
recognizing whether each target dynamic object has a corresponding feature dynamic object and determining the target dynamic object and corresponding feature dynamic object as recognition objects;
recognizing an object state of the target dynamic object in the recognition objects according to a dynamic posture matrix corresponding to the recognition objects, a static posture matrix corresponding to the first static object, a static posture matrix corresponding to the second static object, and a preset threshold matrix;
generating a target image according to the object state, the first dynamic position and the first image, and generating a target projection image according to the object state, the first dynamic position and the target image;
obtaining an image depth recognition model by training a preset depth recognition network, based on a gradient error between an initial depth image corresponding to the first image and the target image and a photometric error between the target projection image and the target image.

10. The method for recognizing image depth according to claim 9, wherein the instance segmentation model comprises a feature extraction layer, a classification layer, and a mapping layer, wherein obtaining a first static object, a plurality of first dynamic objects and a first dynamic position of each first dynamic object by performing an instance segmentation on the first image comprises:
standardizing the first image and obtaining a standardized image;
performing a feature extraction on the standardized image through the feature extraction layer and obtaining an initial feature map;
segmenting the standardized image to obtain a rectangular area corresponding to each pixel point in the initial feature map, based on a multiple relation between a size of the initial feature image and a size of the standardized image and a convolution step in the feature extraction layer;
classifying the initial feature map and obtains a prediction probability that each pixel point in the initial feature map belongs to a first preset category through the classification layer;
determining a plurality of pixel points corresponding to the prediction probability with a value greater than a preset threshold in the initial feature map as a plurality of target pixel points;
determining a plurality of rectangular areas corresponding to the plurality of target pixel points as a plurality of feature areas;

mapping each feature area into the initial feature map through the mapping layer, and obtaining a plurality of mapping areas;

dividing the plurality of mapping areas based on a preset quantity and obtaining a plurality of partition areas;

determining a center pixel point in each partition area;

calculating a pixel value of the center pixel point;

pooling the pixel value of the center pixel point and obtaining a mapping probability value corresponding to each mapping area;

restoring the plurality of mapping areas and obtaining a target feature map by splicing the plurality of restored mapping areas;

generating the first static object, the plurality of first dynamic objects and the first dynamic position of each first dynamic object according to the target feature map, the mapping probability value, the plurality of restored mapping areas and a second preset category.

11. The method for recognizing image depth according to claim 10, wherein generating the first static object, the plurality of first dynamic objects and the first dynamic position of each first dynamic object according to the target feature map, the mapping probability value, the plurality of restored mapping areas and a second preset category comprises:

classifying each pixel point in the target feature map according to the mapping probability value and the second preset category, and obtaining a pixel point category of each pixel point in the restored mapping areas;

determining areas composed of a plurality of pixel points corresponding to the same pixel point category in the restored mapping areas as a first object;

acquiring pixel coordinates of all pixel points in the first object;

determining the pixel coordinates as a first position corresponding to the first object;

determining whether the first object is the first dynamic object or the first static object according to preset rules and determining the first position corresponding to the first dynamic object as the first dynamic position.

12. An electronic device comprising:

a storage device;

at least one processor; and the storage device storing one or more programs, which when executed by the at least one processor, cause the at least one processor to:

obtain a first image and a second image;

obtain a first static object, a plurality of first dynamic objects and a first dynamic position of each first dynamic object by performing an instance segmentation on the first image, obtaining a second static object and a plurality of second dynamic objects by performing an instance segmentation on the second image, through an instance segmentation model;

select a plurality of target dynamic objects from the plurality of first dynamic objects based on the number of pixel points in each first dynamic object and preset positions and select a plurality of feature dynamic objects from the plurality of second dynamic objects based on the number of pixel points in each second dynamic object and the preset positions;

recognize whether each target dynamic object has a corresponding feature dynamic object and determine the target dynamic object and corresponding feature dynamic object as recognition objects;

recognize an object state of the target dynamic object in the recognition objects according to a dynamic posture matrix corresponding to the recognition objects, a static posture matrix corresponding to the first static object, a static posture matrix corresponding to the second static object, and a preset threshold matrix;

generate a target image according to the object state, the first dynamic position and the first image, and generate a target projection image according to the object state, the first dynamic position and the target image;

obtain an image depth recognition model by training a preset depth recognition network, based on a gradient error between an initial depth image corresponding to the first image and the target image and a photometric error between the target projection image and the target image.

13. The electronic device according to claim 12, wherein the instance segmentation model comprises a feature extraction layer, a classification layer, and a mapping layer, wherein the at least one processor obtains a first static object, a plurality of first dynamic objects and a first dynamic position of each first dynamic object by performing an instance segmentation on the first image by:

standardizing the first image and obtaining a standardized image;

performing a feature extraction on the standardized image through the feature extraction layer and obtaining an initial feature map;

segmenting the standardized image to obtain a rectangular area corresponding to each pixel point in the initial feature map, based on a multiple relation between a size of the initial feature image and a size of the standardized image and a convolution step in the feature extraction layer;

classifying the initial feature map and obtains a prediction probability that each pixel point in the initial feature map belongs to a first preset category through the classification layer;

determining a plurality of pixel points corresponding to the prediction probability with a value greater than a preset threshold in the initial feature map as a plurality of target pixel points;

determining a plurality of rectangular areas corresponding to the plurality of target pixel points as a plurality of feature areas;

mapping each feature area into the initial feature map through the mapping layer, and obtaining a plurality of mapping areas;

dividing the plurality of mapping areas based on a preset quantity and obtaining a plurality of partition areas;

determining a center pixel point in each partition area;

calculating a pixel value of the center pixel point;

pooling the pixel value of the center pixel point and obtaining a mapping probability value corresponding to each mapping area;

restoring the plurality of mapping areas and obtaining a target feature map by splicing the plurality of restored mapping areas;

generating the first static object, the plurality of first dynamic objects and the first dynamic position of each first dynamic object according to the target feature map, the mapping probability value, the plurality of restored mapping areas and a second preset category.

14. The electronic device according to claim 13, wherein the at least one processor generates the first static object, the plurality of first dynamic objects and the first dynamic position of each first dynamic object according to the target feature map, the mapping probability value, the plurality of restored mapping areas and a second preset category by:
- classifying each pixel point in the target feature map according to the mapping probability value and the second preset category, and obtaining a pixel point category of each pixel point in the restored mapping areas;
- determining areas composed of a plurality of pixel points corresponding to the same pixel point category in the restored mapping areas as a first object;
- acquiring pixel coordinates of all pixel points in the first object;
- determining the pixel coordinates as a first position corresponding to the first object;
- determining whether the first object is the first dynamic object or the first static object according to preset rules and determining the first position corresponding to the first dynamic object as the first dynamic position.

15. The electronic device according to claim 12, wherein the at least one processor selects a plurality of target dynamic objects from the plurality of first dynamic objects based on the number of pixel points in each first dynamic object and preset positions by:
- calculating the number of the pixel points in each first dynamic object;
- sorting the plurality of first dynamic objects according to the number of pixel points;
- selecting the sorted first dynamic object at the preset positions as the plurality of target dynamic objects.

16. The electronic device according to claim 12, wherein the at least one processor recognizes whether each target dynamic object has a corresponding feature dynamic object by:
- acquiring a plurality of target element information of each target dynamic object;
- acquiring feature element information in the feature dynamic object with a same category as each target element information;
- matching each target element information with feature element information of the same category to obtain a matching value;
- when the matching value is within a preset interval, determining that the target dynamic object has a corresponding feature dynamic object.

17. The electronic device according to claim 12, wherein the at least one processor recognizes an object state of the target dynamic object in the recognition objects according to a dynamic posture matrix corresponding to the recognition objects, a static posture matrix corresponding to the first static object, a static posture matrix corresponding to the second static object, and a preset threshold matrix by:
- performing a subtraction operation on each matrix element in the static posture matrix and a corresponding matrix element in the dynamic posture matrix corresponding to the recognition objects and obtaining a plurality of posture differences;
- taking an absolute value of the plurality of posture differences and obtaining posture absolute values corresponding to the static posture matrix;
- arranging the posture absolute values and obtaining a posture absolute value matrix, according to an element position of posture absolute values;
- comparing each posture absolute value in the posture absolute value matrix with a corresponding posture threshold in the preset threshold matrix;
- when there is at least one posture absolute value greater than the corresponding posture threshold in the posture absolute value matrix, determining that the object state of the target dynamic object in the recognition objects is movable;
- when there is no posture absolute value greater than the corresponding posture threshold in the posture absolute value matrix, determining that the object state of the target dynamic object in the recognition objects is stillness.

18. The electronic device according to claim 12, wherein the at least one processor generates a target image according to the object state, the first dynamic position and the first image by:
- when the object state of any target dynamic object in the recognition objects is movable, masking the any target dynamic object in the first image based on the first dynamic position of the any target dynamic object and obtaining the target image;
- when the object state of each target dynamic objects in the recognition objects is stillness, determining the first image as the target image.

19. The electronic device according to claim 12, wherein the at least one processor obtains an image depth recognition model by training a preset depth recognition network, based on a gradient error between an initial depth image corresponding to the first image and the target image and a photometric error between the target projection image and the target image by:
- calculating a depth loss value of the preset depth recognition network based on the gradient error and the photometric error;
- iteratively training the preset depth recognition network based on the depth loss value and obtaining the image depth recognition model when the depth loss value is reduced to a minimum.

* * * * *